United States Patent [19]

Gibbard

[11] Patent Number: 4,493,290
[45] Date of Patent: Jan. 15, 1985

[54] MILK YIELD RECORDING AND CONCENTRATE FEED RATION CALCULATION FOR DAIRY COWS

[75] Inventor: David W. Gibbard, Royston, England
[73] Assignee: Dataface Limited, England
[21] Appl. No.: 495,775
[22] Filed: May 18, 1983

[30] Foreign Application Priority Data

May 27, 1982 [GB] United Kingdom ............... 8215562

[51] Int. Cl.³ .................................................. A01K 5/00
[52] U.S. Cl. ........................................................ 119/51 R
[58] Field of Search ............... 119/14.01, 14.02, 51 R; 364/194, 735

[56] References Cited

U.S. PATENT DOCUMENTS

| | | | |
|---|---|---|---|
| 3,516,575 | 6/1970 | Moffitt | 119/51 R X |
| 3,557,758 | 1/1971 | Lack | 119/51 R |
| 3,929,277 | 12/1975 | Byrne et al. | 119/51 R X |

FOREIGN PATENT DOCUMENTS

| | | | |
|---|---|---|---|
| 1577023 | 10/1980 | United Kingdom | 119/51 R |
| 442775 | 4/1975 | U.S.S.R. | 119/51 R |
| 793515 | 1/1981 | U.S.S.R. | 119/51 R |

Primary Examiner—Robert P. Swiatek
Attorney, Agent, or Firm—Nelson E. Kimmelman

[57] ABSTRACT

System for determining supplementary feed rations for dairy cows, which comprises the steps of:
(a) recording in a hand-holdable microprocessor-based recorder (1) information relating to the cow identity of each of a plurality of cows which are to use a milking parlor,
(b) entering information relating to the cow identity of each cow actually entering the parlor for a milking session, the recorder being programmed to validate the entered cow identities with the recorded cow identities,
(c) entering respective milk yields in relation to respective validated cow identity entries,
(d) after a milking session, connecting the recorder to a master unit (30), and
(e) causing the master unit to read the information in the recorder as to milk yield Y for each identified cow and enter this information into a central processor programmed to compute a value of feed concentrate ration (R) for each cow according to an algorithm having the general form: $R = V(Y - M + L(t) + C)$, where M, L(t) and C are values for "maintenance +", lactation period and cow condition pre-recorded for each cow in a memory of the master unit.

19 Claims, 4 Drawing Figures

MILK YIELD RECORDING AND CONCENTRATE FEED RATION CALCULATION FOR DAIRY COWS

DESCRIPTION

1. Field of Invention

This invention relates to a method and apparatus for recording milk yields of cows in dairy parlours and for the calculation of feed concentrate rations dependent upon the yields and other data.

2. Background to the Invention

It is well known that in order to obtain the full milk yield potential from a cow, it is normally necessary to supplement her "natural" diet with concentrated foods. It is important not to overfeed these concentrates, if only for economic reasons. Concentrated feed is very expensive, and once the full milk yield potential has been reached, the excess feed merely goes to increasing body weight, thus reducing the cow's "Margin over Concentrates" (M.O.C.). The M.O.C. is generally accepted as the performance yardstick of a dairy cow—i.e. the income from the milk she produces in a year less the cost of concentrated feed consumed.

The daily concentrate feed ration for a cow will vary according to several factors, which in themselves are variable. The more frequently these factors can be evaluated and the resulting ration re-calculated, the better will be the M.O.C.

These factors are now listed, and their effect in the ration described. There are many variations of feeding methods, but the general principles are similar.

1. The "value" of the basic food—e.g. grass or silage.

This food is assumed to be freely available, and will usually be enough to maintain a cow's condition and in addition enable her to produce a basic level of milk. This is known as "maintenance +"—e.g. "maintenance + 10 kg" of milk. This figure can actually be negative—i.e. if the grass is poor, it will not even maintain the cow's condition.

The calculation of M is complex but published information is available on this subject.

2. The milk yield (Y)

Feed concentrates are fed to enable the cow to produce its full yield potential. The cow's actual daily milk yield (Y) must be recorded, together with information on the time into the lactation period (i.e. should the yield be rising or falling, and at what rate?).

3. The time since last calving date

This is usually recorded as the last calving date and the period into the lactation period is calculated. The milk yield is expected to rise for about 100 days after calving. During this period it is normal practice to feed the cow in anticipation of this—known as "Lead Feeding".

During the next 100 days, the yield slowly falls, and the cow is "fed to yield"—i.e. as though the curve were flat.

During the next 100 days, it is usual to reduce the feed to accelerate "drying off" before calving again.

The factor which is dependent on the time into the lactation period will be referred to as $L(t)$.

4. The value of the concentrate feed

The greater the nutritional value of the concentrates, the less weight needs to be fed for a given milk yield. This factor (V) is usually expressed as weight per kg of milk and is typically 0.4 kg per kg of milk.

5. Condition of the Cow (C)

If the cow is in poor condition, food will be used to improve its health rather than in producing milk. Thus extra feed should be given to a cow in poor condition to improve its condition without reducing its milk yield.

The daily feed concentrate ration can therefore be calculated from the expression $R = V(Y - M + + L(t) + C)$ kg.

References which contain information on factors affecting milk yield are:

(1) MAFF Technical Bulletin 33 "Energy Allowances and Feeding Systems for Ruminants", HMSO 1975.

(2) ADAS Booklet 2087 "Nutrient Allowances and Composition of Feeding Stuffs for Ruminants", MAFF 1976.

(3) MAFF/ADAS Advisory Leaflet 612 "Condition Scoring of Dairy Cows", HMSO 1978.

It will be appreciated that the task of gathering all the necessary data (particularly milk yields) and carrying out this calculation for every cow in the herd is formidable. Most farmers only do it once per month.

Systems are available which automatically identify cows, meter their milk, and carry out the calculations, but they are extremely expensive and of limited reliability at the present state of the art.

In addition to calculating feed rations, the farmer has also to control the insemination of a cow to induce calving. Information relating to "bulling" behaviour (i.e. a cow's behaviour when on heat) will allow the farmer to make correct assessments in this connection. Thus the farmer will make a note when he first observes bulling behaviour and provided an adequate period has elapsed since the last calving, makes arrangements for insemination. It is important from the milk production point of view that a cow calves as soon as is biologically advisable after the previous calving. If conception does not occur first time, the cow will be seen to be "bulling" again in a few weeks. This will be a much earlier indication than waiting for a pregnancy test. The farmer should note the event again and arrange for a further insemination. He will want to keep a record of the bulling dates. A cow which is slow to conceive may be in poor health, or may be becoming too old, and should not be used for breeding more dairy cows.

It is an object of this invention to provide an economical system which enables a farmer to record milk yields and calculate feed rations for his cows.

It is intended that the invention shall provide for cow numbers and milk yields to be checked for validity at the time of recording.

It is also intended that the invention shall be capable of being connected to an automatic feed dispensing system after the recording operation so that the feed programmes in the dispensing system may be updated automatically in accordance with the rations calculated.

It is a further object of the invention that the system shall be capable of being used to record certain "events" or "warning conditions" relating to cows, and to recommend actions as a result. In particular, this will assist controlling the serving a a cow following the recording as an "event" of bulling behaviour.

THE INVENTION

According to the present invention there is provided a method of computing feed concentrate rations for dairy cows comprising the steps of (a) recording in a handheld microcomputer-based recorder information relating to the cow numbers of each of a plurality of cows which are to use a milking parlour;

(b) entering into the recorder the actual cow numbers of cows entering the parlour, the recording being programmed to compare the entered numbers with the recorded numbers, so as to generate a warning signal if an incorrect number is entered or a number is entered twice, in one milking session;

(c) entering against each cow number information relating to the milk yield from the cow concerned;

(d) after the milking session, connecting the recorder to the master unit, containing inter alia a battery charging device to charge the batteries of the handheld recorder and a printer to print out the results;

(e) causing the master unit to read the recorded information in the handheld recorder on milk yield Y for each cow number and enter this information into a central processor programmed to compute a value of R for that cow number according to an algorithm having the general form $$V(Y-M+L(t)+C),$$

using appropriate values for M, L(t) and C from the information stored in the master unit memory, and (f) printing out a list of cow numbers and food rations for each cow for use at the next feeding/milking session or storing the computed values of R for the different cow numbers in a memory associated with an automatic feed ration delivery system, to control the amount of concentrates available to each cow by number, during subsequent feeding/milking sessions.

According to a preferred feature of the invention the method may be extended by the further steps of (i) causing a display associated with the handheld microprocessor to indicate if further information is stored for a particular cow number, and (ii) causing each such item of stored information to be recalled and displayed to be either confirmed or changed by overwriting.

Preferably the extended method includes the step of printing an events list for each cow number, using the said further information stored for each cow number.

The invention also includes within its scope apparatus for performing the above method and/or extended method.

DESCRIPTION OF DRAWINGS

The invention will now be described by way of example with reference to the accompanying drawings in which.

The basis of the system is a portable microcomputer (1) which is used, held in the hand, in a milking parlour to record milk yields of the cows as they are milked. This recording is made by entering data via the unit's keyboard (28). The unit is battery-powdered and is designed to be waterproof which is a requirement of the environment of the parlour.

The portable computer is programmed to tabulate the recorded milk yields against cow numbers in numerical order, regardless of the order in which the data was recorded, together with previous yields for the cows, which data it has retained in its memory, and to perform calculations of feed rations based upon yields and other data listed bove. This other data has been entered into the memory of the computer at a time other than the yield recording time.

The operation of the system may be divided into four phases:

Phase 1—setting up—checking and/or setting the date/time, and identifying "valid" cow numbers;

Phase 2—data entry (other than milk recording)—including "events" like calving and bulling dates, cow condition etc;

Phase 3—milk recording;

Phase 4—data processing and output.

PHASE 1

Setting Up

If the battery is kept charged, it will normally only be necessary to set up once, though occasional changes to the "valid" cow number list will be necessary as cows are bought and sold.

Figure 3:
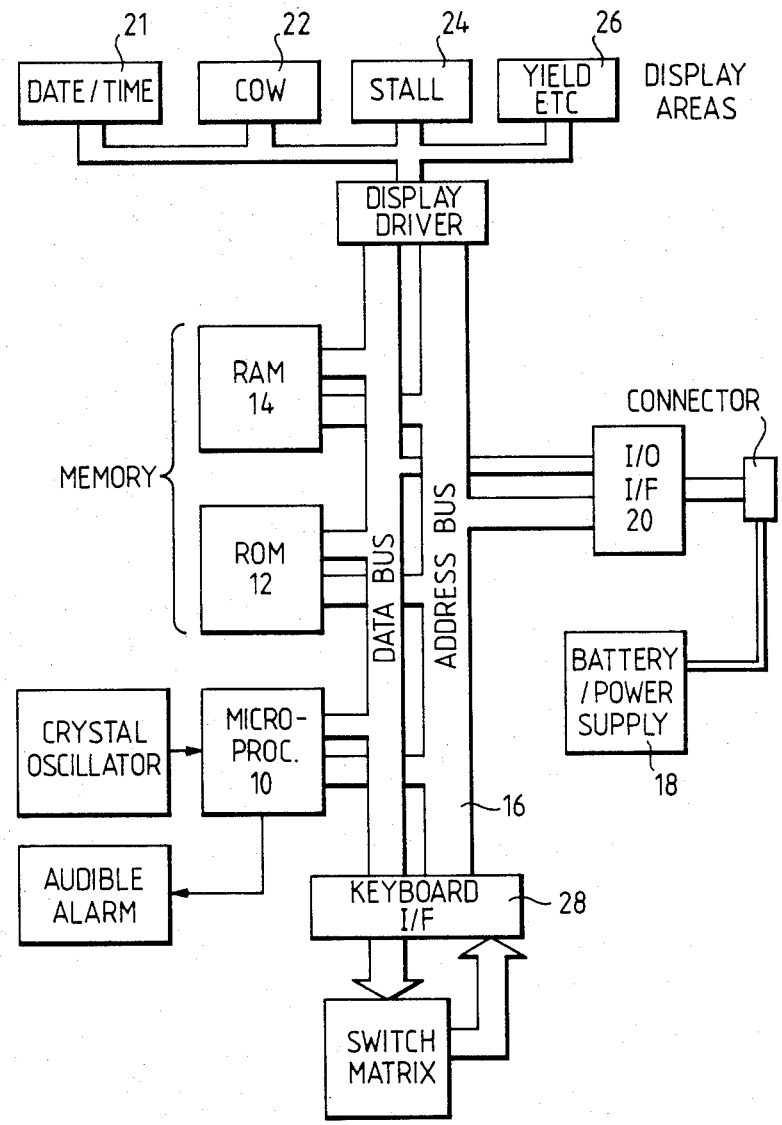
FIG. 3 shows the internal organisation of the portable unit.
Figure 4:
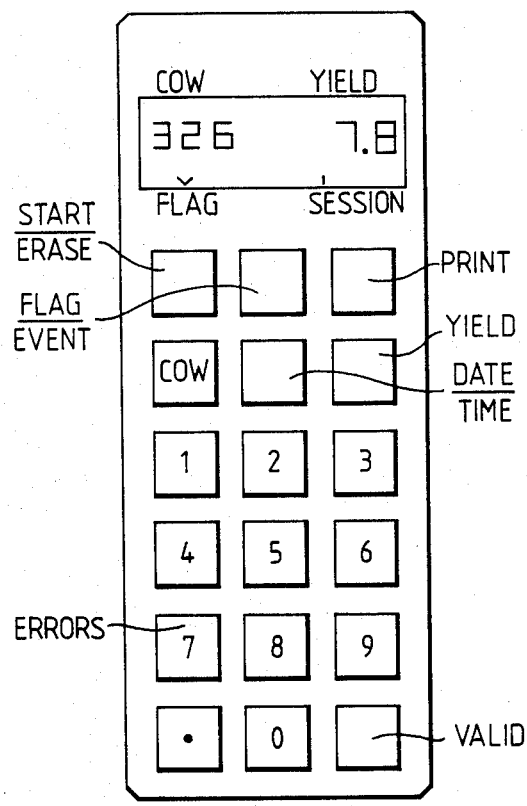
FIG. 4 shows the keyboard and display means of the portable unit illustrating the control and data keys and the two most commonly used display means—for cow numbers and milk yield data.

By setting up a count in its RAM memory (item 14 in FIG. 3) the microprocessor keeps track of time and date by counting down the accurately timed oscillator pulses. Operation of the DATE/TIME control key (FIG. 4) will be taken by the microprocessor as an instruction to display the date and time on the display means, and to accept alterations to the digits via the numeric keys. The exact method of operation is described in our Patent Application No. 8,129,406. Although FIG. 3 shows the DATE/TIME display as being separate, the display may be shared between this function and others in the device.

The next setting-up operation is to identify valid cow numbers. Although cows are commonly numbered up to 999, the average herd size in the UK is less than 100 cows, so there are many redundant numbers. The system will check each cow number entry against its list of valid numbers. This setting-up operation concerns the establishment of this list.

The key sequence COW, followed by a number, followed by VALID will cause the microprocessor to take the cow number entered and place it in its memory (RAM) in a position in the list of valid cow members.

PHASE 2

Data entry (other than milk recording)

This data is mostly of a type which is best entered with the portable unit in the office. This allows it to be connected to its printer unit at the time, and the printer may be used by the computer to present questions to the farmer concerning the data to be stored, inviting a simple response. This overcomes the problem of communicating with the computer via an otherwise limited keyboard and display means, and is much less prone to errors.

The operation of the key sequence START, PRINT, is interpreted by the microprocessor as an instruction to select a part of its programme from the ROM (FIG. 3, 12) which will allow data to be entered after it types a message on the printer. It will first select a sequence of code from another part of the ROM and send it to the printer via the I/O connector. This code causes the printer to type a message:

"Enter Maintenance+(kg) for herd". "Present M+ =5.8 kg".

The microprocessor then waits for a number to be entered on the keyboard and confirmed by operation of the VALID key. It responds by storing the new value in the location in RAM (14) reserved for this purpose and send more code from ROM to the printer.
"New M+ =9.5 kg".
"Enter value of concentrate".
"Present value 0.4 kg feed/kg milk".

If no change to the M+ data is required, the existing data is confirmed by pressing VALID. The response in this case is:
"M+ unchanged 5.8 kg".
"Enter value of concentrate" etc Proceeding in this way the programme will invite the farmer to identify a cow for which he wishes to change the stored data.

A typical sequence might be:

| Message | Keyed Response |
| --- | --- |
| "Enter cow number for change" | 1, 2, 3, VALID |
| "Cow 123 calving date 3.2.82. Change?" | VALID |
| "No change. Condition 4. Change?" | 3, VALID |
| "Cow 123. Condition 3" | |
| "Enter cow number for change" | VALID |
| "No more?" | VALID |

The programme then leaves the entry sequence and the microprocessor resumes a "background" job, like displaying the time.

Other data which can be recorded includes "events" other than calving, e.g. bulling: and warning conditions. These will be described separately below. Such data usually differs from that described above in that it is usually recorded whilst the computer is in "portable" mode, though not in the milking parlour which is the case with milk yield recording.

PHASE 3

Milk Yield recording

It is normal practice in the UK to milk into jars before emptying them into a bulk tank. The jars are fitted with a scale in kg. In other cases where milk goes direct to the tank, some sort of milk meter is required.

To start the recording session, the "START" key is operated. It is necessary to repeat this operation after a few seconds. This is a safeguard against unintentionally starting a new session by accidentally pressing START during the recording operation.

The second START key depression indicates to the microprocessor that a new recording session is being started.

It moves all the yield data entered before into a store area (RAM) allocated to "previous yield" data, clearing the way for a new recording.

It reads the date/time RAM location and stores the instantaneous value in a location allocated to the heading or title of the current yield record.

A number of cows are allowed into the parlour and milked. When the milk flow stops, the portable unit is taken along the parlour and in turn the cows are identified, from their brands and their yield recorded as follows:

| Key Operation | Cow Display | Yield Display |
| --- | --- | --- |
| COW | 0 | blank |
| 5, 7, 2, YIELD | 572 | 0.0 |
| 7.9 | 572 | 7.9 |
| VALID | | |
| COW | 0 | blank |
| 4, 1, 2, YIELD | 412 | 0.0 |
| etc ... | | |

The operation of the portable unit hardware in response to these control keys is:

COW—to ready to accept numbers for display in the cow display field.

YIELD—the cow number has been entered. Check it against the list of valid cow numbers stored in RAM.

If the entered number is not found, sound an alarm and flash the cow display.

If VALID is pressed at this time, be ready for the yield to be entered for this cow and add the cow's number to the valid list.

If COW is pressed, cancel the entry and be ready for the next cow

Another check performed is to search the current record to see if the entered cow number has already had a yield recorded. If it has, display that yield, sound the warning and "flash" the cow number.

If COW is then pressed, cancel the entry and be ready for the next cow.

If VALID is pressed, remove the YIELD recorded against the cow, and put into an "error" list. Be ready to accept the yield data for the cow. (The significance of this is that upon checking, the operator finds that he has correctly identified the cow. This means that the first time the cow was incorrectly identified. It will be possible to find the true identity of the cow after printing the complete record—see Phase 4).

VALID (after entering the milk yield)—Store the cow number and milk yield in the current record store.

A check may be performed at this time upon the value of the current yield. The computer will call up from its memory the average yield for the cow in question. If the current entry differs from this by more than 25%, it is alarmed audibly and by flashing the yield display.

Operation of VALID will cause the current entry to be accepted and stored.

Operation of YIELD will clear the current entry and allow another value to be entered.

PHASE 4

Data processing and output

Once all the cow have been milked, the portable unit is returned to the office and connected to the printer unit (30) for review of recordings, editing of errors, and processing data.

The cable from the printer unit (or the interface box as in FIG. 2) is plugged into the portable unit. This action causes battery charging to begin, and allows data to be output when the command PRINT is given to the microprocessor via the keyboard.

The listing consists of the following types of information:
  (a) fixed blocks of data—e.g. titles, headings of columns;
  (b) stored data—e.g. cow number, current yield, previous yield, calving date;
  (c) derived data—e.g. feed ration, milk yield totals.

Derived data is calculated from the stored parameters dynamically during printout (or during transfer in the case of connection to a feed control system or computer).

Consequently any changes which are made during editing will be taken into account when the derived data is recalculated upon printout. No "recalculate" command is required.

The data is presented in the following columns:
  COW—the cow number. Upon output, the microprocessor searches its valid table for the next valid cow number and sends a corresponding code to the I/O connector.
  FLAGS—any stored "warning" conditions. The microprocessor looks in the RAM area reserved for cow data at an address defined by the cow number and finds stored parameters. These are stored warning parameters—see below.
  CURRENT YIELD—the yield in the current session (stored data).
  PREVIOUS YIELD—the yield in the previous session (stored data)
  24 HOUR YIELD—a derived parameter=CURRENT+PREVIOUS in the case of the normal practice of two milking sessions per day. This is calculated each time it is required to be output.
  AVERAGE YIELD—a derived parameter—the new 24 hour total is included in the stored average.
  CALVING DATE—stored data.
  COW CONDITION—stored data.
  RECOMMENDED FEED—derived upon output as described on above.

This data is produced and output for each valid cow.

At the bottom of each column, the following totals are given. They are derived dynamically as the cow data is output:

They are—number of cows, total current yield, previous, total yield, 24 hour herd yield, and herd average yield, total recommended feed.

Lastly, a list of errors. These are cows incorrectly recorded as described on page 9. The error list gives these cow numbers and the yield recorded. It will be possible to find which cow should have been identified during recording since there will be as many cows in the list with zero recording as there are in the error list.

The erroneous results may be edited simply by going through the recording procedure, using the correct cow numbers and the milk yields in the error list. The error list is then deleted by the microprocessor in response to the key sequence ERASE, ERRORS.

Upon review of the feed recommendations, the farmer may wish to alter the parameters, e.g. cow condition. He does this as described in Phase 2 operation.

A further PRINT operation will cause all the stored data to be output again together with the recalculated derived data.

Figure 1:
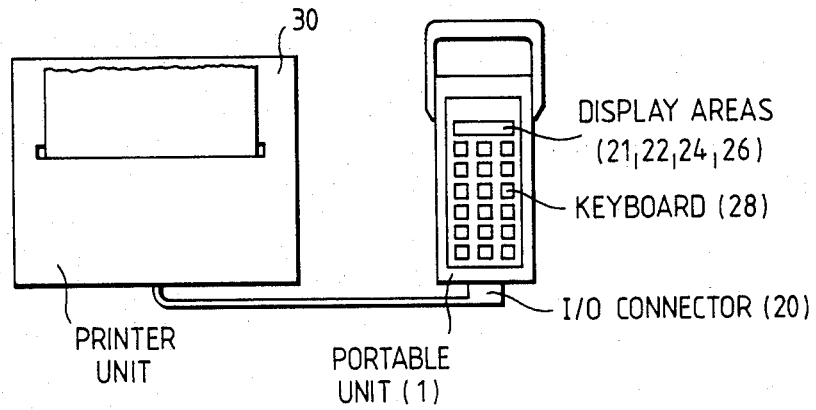
FIG. 1 shows the portable unit connected to a printer unit which is the normal means for presenting the said tbulated data. In this version the printer unit also incorporates a battery charging circuit which recharges the batteries in the portable unit via the I/O connector whilst it is connected to it.
Figure 2:
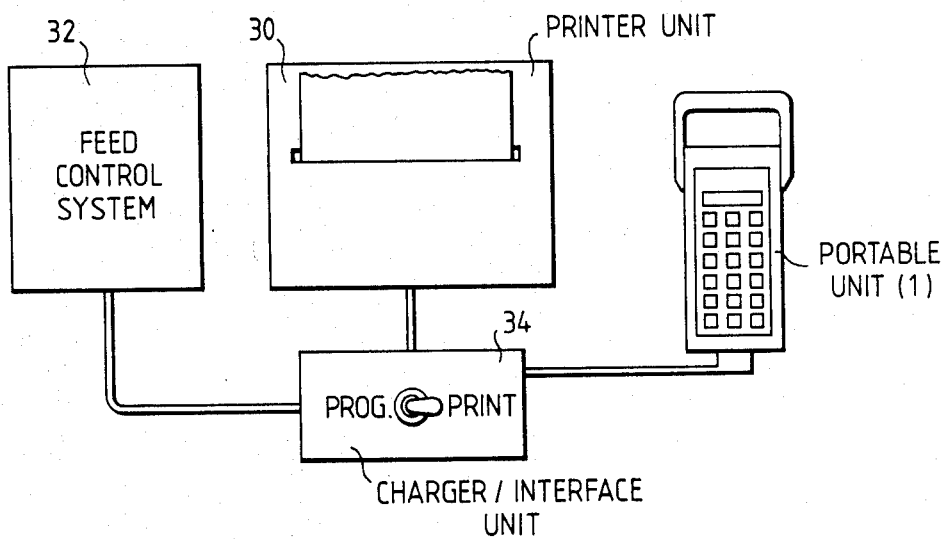
FIG. 2 shows an alternative configuration which also enables the calculated feed ration to be entered into the memory of an automatic feed dispensing system.

If the system is as shown in FIG. 2—i.e. with a feed control system (32), the charger/interface unit will be fitted with a switch (34). With this switch in the "PRINT" position, the operation is just as described above. This operation is carried out first to confirm the data is acceptable. The switch is then moved to the PROGRAM position and a further output operation is carried out. The output data is routed to the feed control system (32) which is programmed to accept the feed ration data and put into its memory in addresses defined by the corresponding cow number data.

The recording of "events" and warning "flags" or conditions is another important aspect of the invention. It has been illustrated by the example of the event of calving date which has particular significance in the calculation of feed rations in another aspect of the invention. Reference has also been made to the "bulling" event, and other warning conditions.

In the UK, the Milk Marketing Board recognises fourteen significant, recordable "events"—all dates—including dates of purchase, calved, sold, dry, dead, suckling etc.

There are also many warning conditions that a farmer will wish to record and be reminded of whenever he identifies a cow for recording purposes. Such flags include mastitis (up to 4—one for each udder quarter), lameness (again possibly 4, one for each leg), and various forms of treatment.

The operation of the apparatus regarding these "events" and "flags" is similar to the operation already described but has been omitted until now so as not to interrupt the logic of the description of the operation as it related to feeding.

The operation in respect of events and flags makes use of the FLAG/EVENT control.

The farmer allocates flag and event numbers which have not been pre-programmed. Let us suppose flag/events numbered 1 to 20 are flags, and 21 to 40 are events.

"Flags" are single "bits" of data—e.g. flag 1 may indicate mastitis in the first quarter.

Events are dates requiring several bits of data, e.g. event 21 might be the "bulling" date.

As an illustration, let us consider the operation of recording a bulling flag. (Flag 21)

The key sequence would be:

| | |
|---|---|
| COW, 1, 3, 2, FLAG/EVENT | If a warning flag has already been recorded for cow 132, the "flag" chevron is flashed, and the flag number displayed in the yield display field. Pressing VALID acknowledges this and the next flag number already recorded (if any) is displayed. Pressing ERASE on the other hand cancels the stored "flag". If no (further) flags are already recorded, the flag display indicates zero. |
| 2, 1 | 21 appears in the flag display (the yield display area). |
| VALID | If a bulling "event" is already recorded, the date of the event is displayed and a warning sounded. To cancel it, press ERASE now. |

| | |
|---|---|
| -continued | |
| VALID | The current date is displayed and committed to memory, together with the identifying number 21 in the store at an address associated with cow 132. The previous bulling date, if any, is still kept in memory. |

This recorded data is subsequently presented as described for Phase 4 of the operation. After listing the herd with the milk yields and feeding data, the microprocessor goes on to present an EVENT list.

For each cow with a recorded event (apart from calving which is a special case and already dealt with), after the cow number, a list of event numbers and dates is given. Repeated events (like bulling) are shown by more than one date against the event number.

A detailed description of the apparatus shown in FIG. 3 now follows:

Note that control signals between the blocks have been omitted for clarity.

The microprocessor 10 organises the data flows between the other areas, and modifies the data as specified by the programme. The programme is stored in part of the memory 12. This is usually a separate device known as a Read Only Memory (ROM) from which data may only be read. The stored programme is not lost with no power on the device. The ROM is usually removable, allowing a different programme to be inserted. The programme is entered into the ROM by means of a special apparatus which is well known and not the subject of this invention.

The other area of memory, used for storage of data 14, is known as Random Access Memory (RAM). Data may be written to and read from any RAM location or address, specified by the address bus 16.

Most RAM devices available at present are volatile, i.e. without power, stored data is lost. A battery 18 is therefore required not only to operate the unit, but to maintain stored information. The battery and power supply is equipped with a voltage sensor to warn the operator of a low battery, and the need to recharge. If the warning is ignored, the unit will go into a quiescent mode in which current drain is minimised by ceasing operations and powering the ram only. Maintenance current is usually much lower than operating current in low power RAM devices, e.g. CMOS.

An Input/Output interface (I/O I/F) is provided to provide battery charging power. Its other function is to allow data to flow in and out of memory under control of the microprocessor via the data bus, e.g. to print out lists of cow and yield data on a printing device.

There could be more than one such I/O I/F 20, e.g. to communicate with a bar code reading device.

This transfer is usually indirect, going via the microprocessor which may modify it en route, e.g. altering the format to be suitable for the printer field. The display areas receive data from the microprocessor via the data bus whenever it is required to alter the displayed information. The display area is specified by the address bus 16.

The microprocessor interrogates a keyboard (28) at regular intervals of about 3 milliseconds to see whether they key status has changed, and to take action as specified by the programme according to the change.

As an example of the way the apparatus works, consider the programme to have reached the point where it is ready for a cow number to be entered from the keyboard.

The microprocessor will be obeying a small "loop" of programme, extracting instructions in sequence from ROM (12) and obeying them. They will tell the microprocessor to test an address in RAM (14) dedicated to the current key entry. It will do this by putting the address onto the bus and instructing RAM 14 to "READ". RAM 14 puts data from the specified address onto the data bus. If the test result is no change, a jump back to the start of the programme loop occurs. This is known as a conditional jump, i.e. a departure from a progressive sequence of programme instructions according to the result of a test on data.

A timed interrupt occurs to a keyboard reading part of the programme which updates the "current key" RAM address when a change of keyboard status is found.

After the interrupt, the programme returns to the point of departure from the original loop. When it reaches the test of the current key address this time, however, the test indicates a change, and the programme moves out of the loop, to a new part of the programme which updates the cow display area.

I claim:

1. A method of determining feed concentrate rations for dairy cows, comprising the steps of:
    (a) recording in a hand-holdable microprocessor-based recorder information relating to the cow identity of each of a plurality of cows which are to use a milking parlour,
    (b) entering information relating to the cow identity of each cow actually entering the parlour for a milking session, the recorder being programmed to validate the entered cow identities with the recorded cow identities,
    (c) entering respective milk yields in relation to respective validated cow identity entries,
    (d) after a milking session, connecting the recorder to a master unit, and
    (e) causing the master unit to read the information in the recorder as to milk yield Y for each identified cow and enter this information into a central processor programmed to compute a value of feed concentrate ration (R) for each cow according to an algorithm having the general form: $R = V(Y - M + L(t) + C)$, where M, L(t) and C are values for "maintenance +", lactation period and cow condition pre-recorded for each cow in a memory of the master unit.

2. A method according to claim 1, including the step of displaying or printing the values for R in relation to cow identities.

3. A method according to claim 1, including the step of storing the values for R in relation to cow identities in a memory associated with an automatic feed ration delivery system.

4. A method according to claim 1 or claim 2 or claim 3, including the steps of causing a display associated with the recorder to indicate if supplementary information is stored in relation to an identified cow and of causing each such item of supplementary information to be recalled and displayed to be either confirmed or changed by overwriting.

5. A method according to claim 4, including the step of providing an events list for each identified cow, utilising the said stored supplementary information.

6. A method according to claim 5, wherein said events list comprises alphanumeric indicia.

7. Apparatus for determining feed concentrate rations for dairy cows, comprising:
a hand-holdable microprocessor based recorder having a keyboard, a solid state memory having a section in which cow identities are pre-recordable and a section in which identities of cows entering a milking parlour for a milking session are recorded, and a comparator unit for comparing entered cow identities with recorded cow identities in order to verify the latter,
a master processor unit to which the recorder is connectable to enable the master unit to record milk yields (Y) previously entered into the recorder via its keyboard in relation to the validated cow identities, the master unit having a temporary memory for storing the milk yields and a permanent memory for storing pre-determined values for "maintenance $+$" (M), lactation period (L(t)) and cow condition (C) in relation to cow identities, and including an arithmetic unit for programmed computation of feed concentrate ration (R) in relation to cow identities generally in accordance with the algorithm: $R = V(Y - M + L(t) + C)$,
means for displaying the computed feed rations in relation to cow identities.

8. Apparatus according to claim 7, wherein the recorder includes a time clock.

9. Apparatus according to claim 7, wherein the recorder memory includes a history section for storage of supplementary information in relation to cow identities.

10. Apparatus according to claim 9 wherein the recorder is programmed to present or print the supplementary information after presentation of yield and feed ration data.

11. Apparatus according to claim 9, wherein the master unit is programmed to present or print the supplementary information after presentation of yield and feed ration data.

12. Apparatus according to claim 7, wherein the recorder includes a display device.

13. Apparatus according to claim 9 or claim 12, wherein the recorder and master unit are programmed to present or print the supplementary information after presentation of yield and feed ration data.

14. Apparatus according to any of claims 7 to 12, wherein the recorder is programmed to generate a warning signal in the event of failure to validate an entered cow identity.

15. Apparatus according to any of claims 7 to 12, wherein the recorder is battery powered and the master unit includes a battery charger for charging the recorder batteries when the recorder is connected to the master unit.

16. Apparatus according to any of claims 7 to 12, including a switchable interface unit through which the master unit is connectable to the recorder or to the controller of an automatic feed rations dispenser.

17. Apparatus according to any of claims 7 to 12, wherein the recorder is programmed to generate a warning signal if an entered milk yield differs by more than a predetermined amount from a preceding milk yield which has been transferred within the memory to enable the current yield to be entered.

18. Apparatus according to claim 7, wherein said means for displaying the computed feed rations produces an alphanumeric print-out.

19. Apparatus for determining feed concentrate rations for dairy cows, comprising:
a hand-holdable microprocessor based recorder having a keyboard, a solid state memory having a section in which cow identities are pre-recordable and a section in which identities of cows entering a milking parlour for a milking session are recorded, and a comparator unit for comparing entered cow identities with recorded cow identities in order to verify the latter,
a master processor unit to which the recorder is connectable to enable the master unit to record milk yields (Y) previously entered into the recorder via its keyboard in relation to the validated cow identities, the master unit having a temporary memory for storing the milk yields and a permanent memory for storing pre-determined values for "maintenance $+$" (M), lactation period (L(t)) and cow condition (C) in relation to cow identities, and including an arithmetic unit for programmed computation of feed concentrate ration (R) in relation to cow identities generally in accordance with the algorithm: $R = V(Y - M + L(t) + C)$,
means for storing the computed feed rations in relation to cow identities.

* * * * *